(12) United States Patent
Ginzburg et al.

(10) Patent No.: US 7,539,930 B2
(45) Date of Patent: May 26, 2009

(54) SYSTEM, METHOD AND APPARATUS OF PROTECTING A WIRELESS TRANSMISSION

(75) Inventors: Boris Ginzburg, Haifa (IL); Solomon B. Trainin, Haifa (IL)

(73) Assignee: Intel Corporation, Santa Clara, CA (US)

( * ) Notice: Subject to any disclaimer, the term of this patent is extended or adjusted under 35 U.S.C. 154(b) by 645 days.

(21) Appl. No.: 11/236,575

(22) Filed: Sep. 28, 2005

(65) Prior Publication Data

US 2007/0089029 A1 Apr. 19, 2007

(51) Int. Cl.
*H03M 13/03* (2006.01)
(52) U.S. Cl. ............... 714/788; 714/762; 370/503
(58) Field of Classification Search ........... 714/762, 714/788; 370/503
See application file for complete search history.

(56) References Cited

U.S. PATENT DOCUMENTS

2006/0002428 A1* 1/2006 Trainin ............... 370/503

2006/0013189 A1* 1/2006 Fujimoto ............. 370/347
2006/0264185 A1* 11/2006 Jorgensen ............ 455/103

OTHER PUBLICATIONS

IEEE-Std 802.11e-2002 Supplement to 802.11-1999, Wireless LAN MAC and PHY specifications: Medium Access Control (MAC) Quality of Service (Qos) Enhancements; The 802.11e standard.

* cited by examiner

*Primary Examiner*—Guy J Lamarre
(74) *Attorney, Agent, or Firm*—Leason Ellis LLP; Shiloh Peleg & Co.

(57) ABSTRACT

Embodiments of the present invention provide a method, apparatus and system of protecting a wireless transmission. The method according to some demonstrative embodiments of the invention may include based on one or more burst-related sub-commands of a transmit command corresponding to a current packet to be transmitted during a burst period, applying a protection scheme to one or more subsequent packets of the burst period. Other embodiments are described and claimed.

25 Claims, 5 Drawing Sheets

SYSTEM, METHOD AND APPARATUS OF PROTECTING A WIRELESS TRANSMISSION

BACKGROUND OF THE INVENTION

Bursting is a method of sending wireless communication or wireless data frames, such as those used in the IEEE 802.11(e) standard, in succession, e.g., without a back-off period between packets. In order for a wireless data packet to be included in an ongoing burst, the packet may be transmitted within a Short Inter Frame Space (SIFS) or Point Inter Frame Space (PIFS) of a data preceding packet or an Acknowledgment (ACK) of the preceding packet.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings in which:

Figure 1:
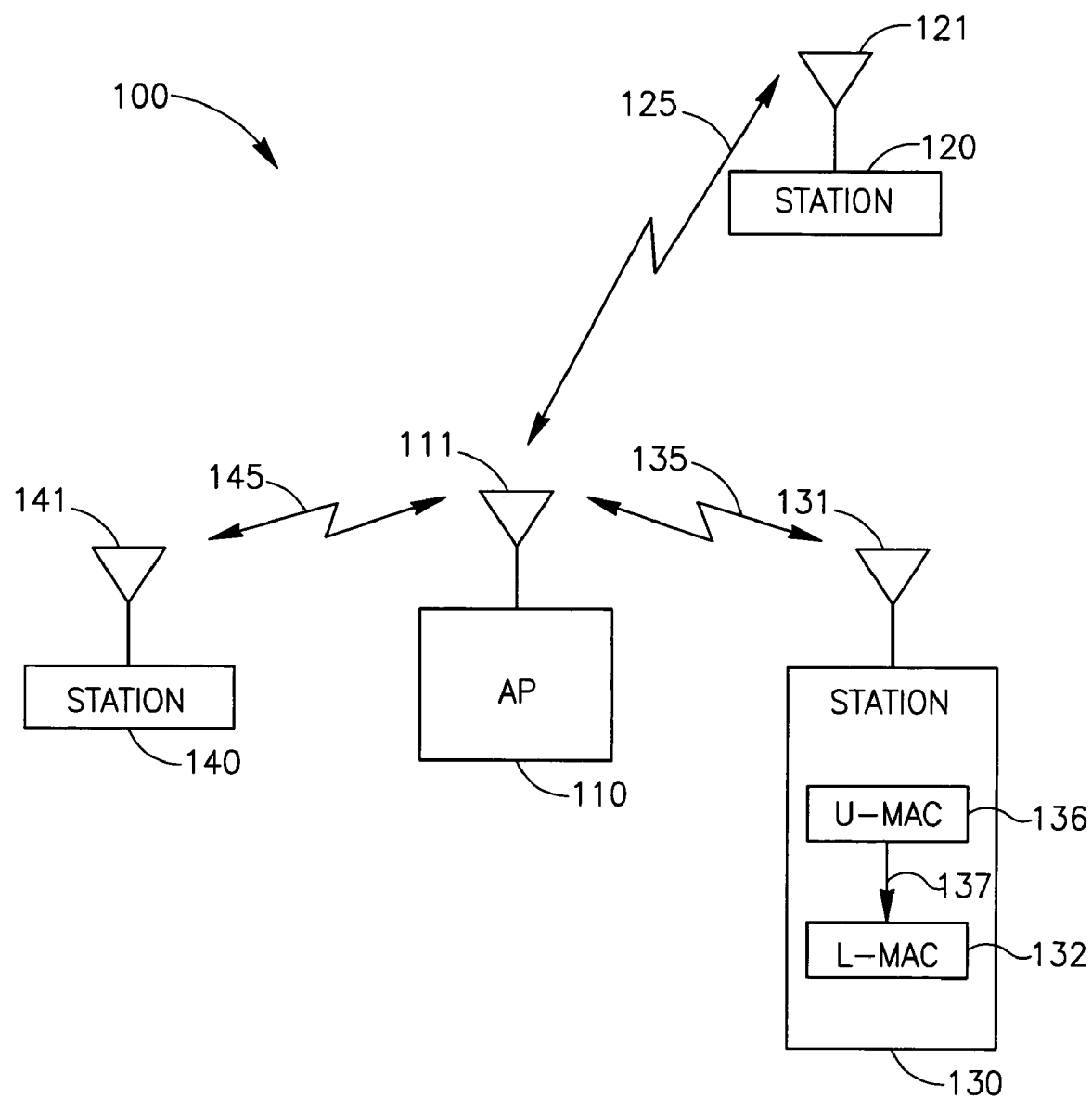
FIG. 1 is a schematic diagram of a wireless communication system in accordance with some demonstrative embodiments of the present invention.

It will be appreciated that for simplicity and clarity of illustration, elements shown in the drawings have not necessarily been drawn accurately or to scale. For example, the dimensions of some of the elements may be exaggerated relative to other elements for clarity or several physical components included in one functional block or element. Further, where considered appropriate, reference numerals may be repeated among the drawings to indicate corresponding or analogous elements. Moreover, some of the blocks depicted in the drawings may be combined into a single function.

DETAILED DESCRIPTION OF THE INVENTION

In the following detailed description, numerous specific details are set forth in order to provide a thorough understanding of the invention. However, it will be understood by those of ordinary skill in the art that the present invention may be practiced without these specific details. In other instances, well-known methods, procedures, components and circuits may not have been described in detail so as not to obscure the present invention.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices. In addition, the term "plurality" may be used throughout the specification to describe two or more components, devices, elements, parameters and the like.

Some embodiments of the invention may be implemented, for example, using a machine-readable medium or article which may store an instruction or a set of instructions that, if executed by a machine (for example, by a processor and/or by other suitable machines), cause the machine to perform a method and/or operations in accordance with embodiments of the invention. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, various types of Digital Versatile Disks (DVDs), a tape, a cassette, or the like. The instructions may include any suitable type of code, for example, source code, compiled code, interpreted code, executable code, static code, dynamic code, or the like, and may be implemented using any suitable high-level, low-level, object-oriented, visual, compiled and/or interpreted programming language, e.g., C, C++, Java, assembly language, machine code, or the like.

It should be understood that the present invention may be used in a variety of applications. Although the present invention is not limited in this respect, the circuits and techniques disclosed herein may be used in many apparatuses such as units of a wireless communication system, for example, a Wireless Local Area Network (WLAN) communication system and/or in any other unit and/or device. Units of a WLAN communication system intended to be included within the scope of the present invention include, by way of example only, modems, Mobile Units (MU), Access Points (AP), wireless transmitters/receivers, and the like.

Types of WLAN communication systems intended to be within the scope of the present invention include, although are not limited to, WLAN communication systems as described by "IEEE-Std 802.11, 1999 Edition (ISO/IEC 8802-11: 1999)" standard ("the 802.11 standard"), and more particularly in "IEEE-Std 802.11e-2002 Supplement to 802.11-1999, Wireless LAN MAC and PHY specifications: Medium Access Control (MAC) Quality of Service (QoS) Enhancements" ("the 802.11e standard"), and the like.

Although the scope of the present invention is not limited in this respect, the circuits and techniques disclosed herein may also be used in units of wireless communication systems, digital communication systems, satellite communication systems and the like.

Devices, systems and methods incorporating aspects of embodiments of the invention are also suitable for computer communication network applications, for example, intranet and Internet applications. Embodiments of the invention may be implemented in conjunction with hardware and/or software adapted to interact with a computer communication network, for example, a LAN, wide area network (WAN), or a global communication network, for example, the Internet.

Part of the discussion herein may relate, for exemplary purposes, to transmitting a packet over a channel. However, embodiments of the invention are not limited in this regard, and may include, for example, transmitting a signal, a block, a data portion, a data sequence, a frame, a data signal, a preamble, a signal field, a content, an item, a message, a protection frame, or the like.

Reference is made to FIG. 1, which schematically illustrates a wireless communication system 100 in accordance with some demonstrative embodiments of the present invention.

In some demonstrative embodiments of the invention, communication system 100 may include a WLAN system. Although the scope of the present invention is not limited in this respect, communication system 100 may be defined, by the 802.11 standard, as a Basic Service Set (BSS). For example, the BSS may include at least one communication station, for example, an AP 110, and stations 120, 130, and 140 at least one of which may be a MU. In some embodiments, stations 140, 130 and 120 may transmit and/or receive one or more packets over wireless communication system 100. The packets may include data, control messages, network information, and the like. Additionally or alternatively, in other embodiments of the present invention, wireless communication system 100 may include two or more APs and two or more mobile stations, in which case wireless communication system 100 may be referred to as an extended service set (ESS), as defined by the 802.11 standard, although the scope of the present invention is not limited in this respect.

According to demonstrative embodiments of the invention, AP 110 may include one or more antennas 111 for transmitting and/or receiving packets, e.g., to/from stations 120, 130 and/or 140. Stations 120, 130 and/or 140 may include one or more antennas 121, 131 and/or 141, respectively, for transmitting and/or receiving packets, e.g., to/from AP 110. Although the scope of the present invention is not limited in this respect, types of antennae that may be used for antennas 111, 121, 131, and/or 141 may include but are not limited to internal antenna, dipole antenna, omni-directional antenna, a monopole antenna, an end fed antenna, a circularly polarized antenna, a micro-strip antenna, a diversity antenna and the like.

According to demonstrative embodiments of the invention, AP 110 may include suitable WLAN AP communication circuitry, for example, AP circuitry able to operate in accordance with the 802.11 standard and/or any other suitable standard. For example, AP 110 may be able to control communication between AP 110 and stations 120, 130 and/or 140 by sending management commands, e.g., via beacons 125, 135, 145, if desired. For example, AP 110 may implement a Carrier Sense Multiple Access/Collision Avoidance (CSMA/CA) mechanism, which may be used to provide collision protection to the transmission of a data frame, if desired.

According to some demonstrative embodiments of the invention, system 100 may implement a transmission mechanism, e.g., a Quality of Service (QOS) mechanism as defined by the 802.11e standard, enabling one or more of stations 120, 130 and 140, to transmit a burst. The burst transmission may be performed during a Transmit Opportunity (TxOp), and may include a succession of a plurality of packets. During the burst transmission, the plurality of packets may be transmitted in succession separated, for example, by Short-Inter-Frame-Space (SIFS) or Point Inter Frame Space (PIFS) periods, e.g., without waiting a back-off period between transmission of the packets. The plurality of packets transmitted during the burst may correspond, for example, to frames having the same Access Category (AC), e.g., as defined by the 802.11e standard.

A protection scheme may be applied to one or more subsequent packets of a current packet to be transmitted during the burst, e.g., in order to protect from collision the transmission of the one or more subsequent packets. For example, the current packet may include a protection-duration field representing a time period for protecting the transmission of one or more of the subsequent packets, e.g., in accordance with the 802.11e standard.

The protection scheme may include, for example, an entire-burst protection scheme, a next-frame protection scheme, e.g., as are defined by the 802.11e standard, or any other suitable protection scheme. If the next-frame protection scheme is implemented, then the protection duration field of the current packet may include a duration value corresponding to a transmission period of only some of the subsequent packets, e.g., a packet immediately successive to the current packet. The protection duration-field of the current packet may include a duration value corresponding to a transmission period of all of the subsequent packets, for example, if the entire-burst protection scheme is implemented.

According to some demonstrative embodiments of the invention, one or more of stations 120, 130, and 140 may be able to select a protection scheme to be applied to one or more of the subsequent packets. For example, one or more of stations 120, 130, and 140 may be able to select either one of the next-frame protection scheme and the entire-burst protection scheme, e.g., as described below.

In some demonstrative embodiments of the invention, one or more of stations 120, 130 and 140 may include a partitioned Media Access Controller (MAC) configuration, e.g., including an Upper MAC (U-MAC) portion 136, and a Lower MAC (L-MAC) portion 138.

According to some demonstrative embodiments of the invention, U-MAC 136 may select a protection scheme to be applied to a frame, and generate a transmit (Tx) command 137 including one or more burst-related sub-commands corresponding to the selected protection scheme. The one or more burst-related subcommands may include, for example, an indication of the selected protection scheme, and/or one or more duration values corresponding to the frame, e.g., as are described below. L-MAC 138 may apply a protection scheme to the one or more packets succeeding a packet corresponding to the frame, based on the one or more burst-related sub-commands. For example, L-MAC 138 may apply the protection scheme indicated by the burst related sub-commands, e.g., if the packet is intended to be the first packet in the burst transmission; or a protection scheme applied to one or more previous packets of the burst transmission, e.g., if the packet is not intended to be the first packet in the burst transmission, as described below.

According to some demonstrative embodiments of the invention, L-MAC 138 may also control transmission of the packet including a protection-duration field corresponding to the determined protection scheme, e.g., as described in detail below.

Figure 2:
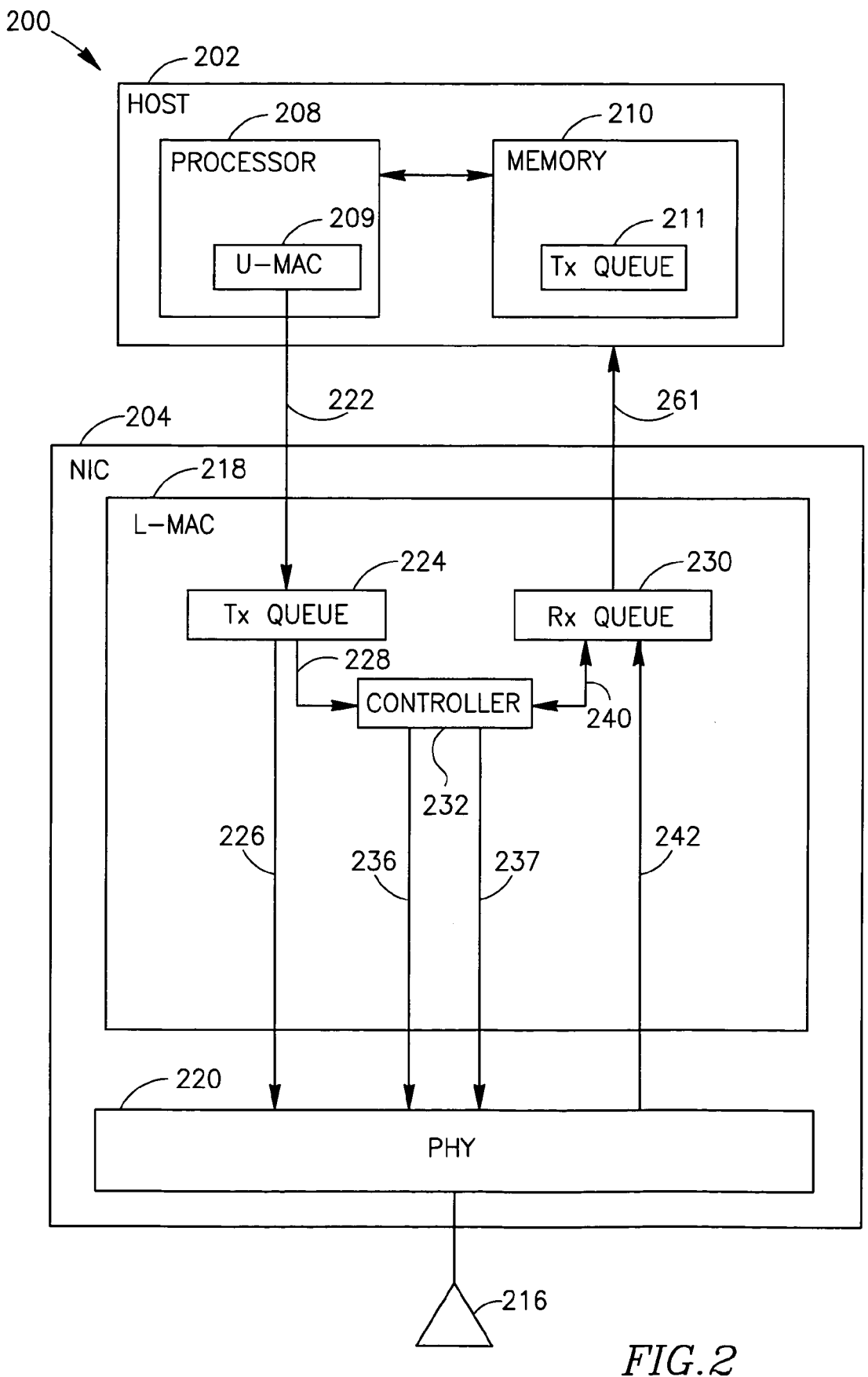
FIG. 2 is a schematic illustration of a wireless communication station in accordance with some demonstrative embodiments of the invention.

Reference is made to FIG. 2, which schematically illustrates a wireless station 200 in accordance with some demonstrative embodiments of the invention. Although the invention is not limited in this respect, station 200 may be used to perform the functionality of at least one of stations 120, 130 and 140 (FIG. 1).

According to demonstrative embodiments of the invention, station 200 may include a host 202 associated with a wireless communication module, e.g., a Network Interface Card (NIC) 204, as are described in detail below.

In some embodiments, host 202 may include or may be, for example, a computing platform, e.g., a personal computer, a desktop computer, a mobile computer, a laptop computer, a notebook computer, a terminal, a workstation, a server computer, a Personal Digital Assistant (PDA) device, a tablet computer, a network device, or other suitable computing device.

According to some demonstrative embodiments of the invention, host 202 may include a processor 208, which may be associated with a memory 210.

Processor 208 may include, for example, a Central Processing Unit (CPU), a Digital Signal Processor (DSP), a microprocessor, a host processor, a plurality of processors, a controller, a chip, a microchip, or any other suitable multi-purpose or specific processor or controller. Memory 210 may include, for example, a random access memory (RAM), a read only memory (ROM), a dynamic RAM (DRAM), a synchronous DRAM (SD-RAM), a Flash memory, a volatile memory, a non-volatile memory, a cache memory, a buffer, a short term memory unit, a long term memory unit, or other suitable memory units or storage units.

According to some demonstrative embodiments of the invention, processor 208 may execute instructions resulting in a U-MAC 209. U-MAC 209 may manage, for example, a Tx queue 211 including one or more Tx frames, e.g., as is known in the art. In some demonstrative embodiments, Tx queue 211 may include data frames corresponding to one or more Access Categories (ACs), e.g., as are defined by the 802.11e standard.

According to some demonstrative embodiments of the invention, U-MAC 209 may also generate a Tx command 222, e.g., based on a frame of Tx queue 211 ("the current frame").

According to some demonstrative embodiments of the invention, U-MAC 209 may select from at least two protection schemes, a protection scheme ("the selected protection scheme") intended to be applied to a potential burst transmission including a packet corresponding to the current frame. U-MAC 209 may select, for example, between the next-frame protection scheme and the entire-burst protection scheme, e.g., based on any suitable criteria. In one example, U-MAC 209 may select the next-frame protection scheme if the burst transmission is intended to implement an Acknowledge (ACK) transmission policy, as is known in the art. In another example, U-MAC 209 may select the entire-burst protection scheme, for example, if the burst transmission is intended to implement a "No ACK", or a "Block ACK" transmission policy, as are known in the art. In yet another example, U-MAC 209 may select the entire-burst protection scheme, for example, if the burst transmission is intended to be performed in a mixed client environment, e.g., as defined by "IEEE-Std 802.11g-2003 Supplement to 802.11-1999, Wireless LAN MAC and PHY specifications: Further Higher Data Rate Extension in the 2.4 GHz band". U-MAC may select the protection scheme based on any other suitable criteria.

According to some demonstrative embodiments of the invention, Tx command 222 may include one or more burst-related sub-commands, e.g., as described below.

Figure 3:
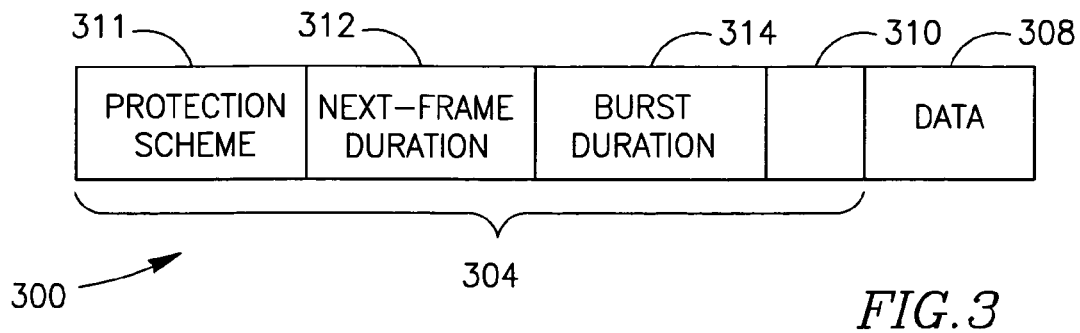
FIG. 3 is a schematic illustration of a transmit command in accordance with some demonstrative embodiments of the invention.

Reference is made to FIG. 3, which schematically illustrates a Tx command 300 in accordance with some demonstrative embodiments of the invention. Although the invention is not limited in this respect, Tx command 300 may be generated by U-MAC 209 (FIG. 2) based on the current frame.

According to some demonstrative embodiments of the invention, Tx command 300 may include a Tx sub-command portion 304, and a data portion 308. Portion 304 may include one or more fields representing one or more burst-related sub-commands and/or parameters. For example, portion 304 may include a field 311 including one or more bits indicating a protection scheme intended to be applied to a burst transmission corresponding to Tx command 300. For example, field 311 may indicate the protection scheme selected by U-MAC 209 (FIG. 2), e.g., either one of the entire-burst protection scheme, and the next-frame protection scheme.

According to some demonstrative embodiments of the invention, portion 304 may also include a next-frame duration field 312, and a burst-duration field 314, as are described below. Portion 304 may include one or more other field, e.g., field 310, representing any other suitable Tx parameters, sub-commands, and/or values, e.g., as are known in the art.

According to some demonstrative embodiments of the invention, field 312 may include bits representing the length of a frame ("next-frame duration value"), e.g., a frame of queue 211 (FIG. 2) immediately subsequent to the current frame. Field 314 may include bits representing a duration ("burst duration value") of one or more frames, e.g., one or more frames of queue 211 (FIG. 2), subsequent to the current frame and suitable for transmission during the potential burst. For example, field 314 may include bits representing the transmission duration of one or more frames having the same AC as the current frame.

Refereeing back to FIG. 2, according to some demonstrative embodiments of the invention U-AMC 209 may generate Tx command 222 including the next-frame duration field, e.g., if the next-frame protection scheme is selected by U-MAC 209. U-MAC 209 may determine the next-frame duration field, for example, based on a MAC Protocol Data Unit (MPDU) length of a frame in queue 211, for which U-MAC 209 is to generate a TX command in succession to the current frame. U-MAC 209 may generate Tx command 222 including the next-frame duration field, and the burst duration field, e.g., if the entire-burst protection scheme is selected.

According to some demonstrative embodiments of the invention, U-MAC 209 may determine the burst duration value using any suitable method, e.g., as described below.

Figure 4:
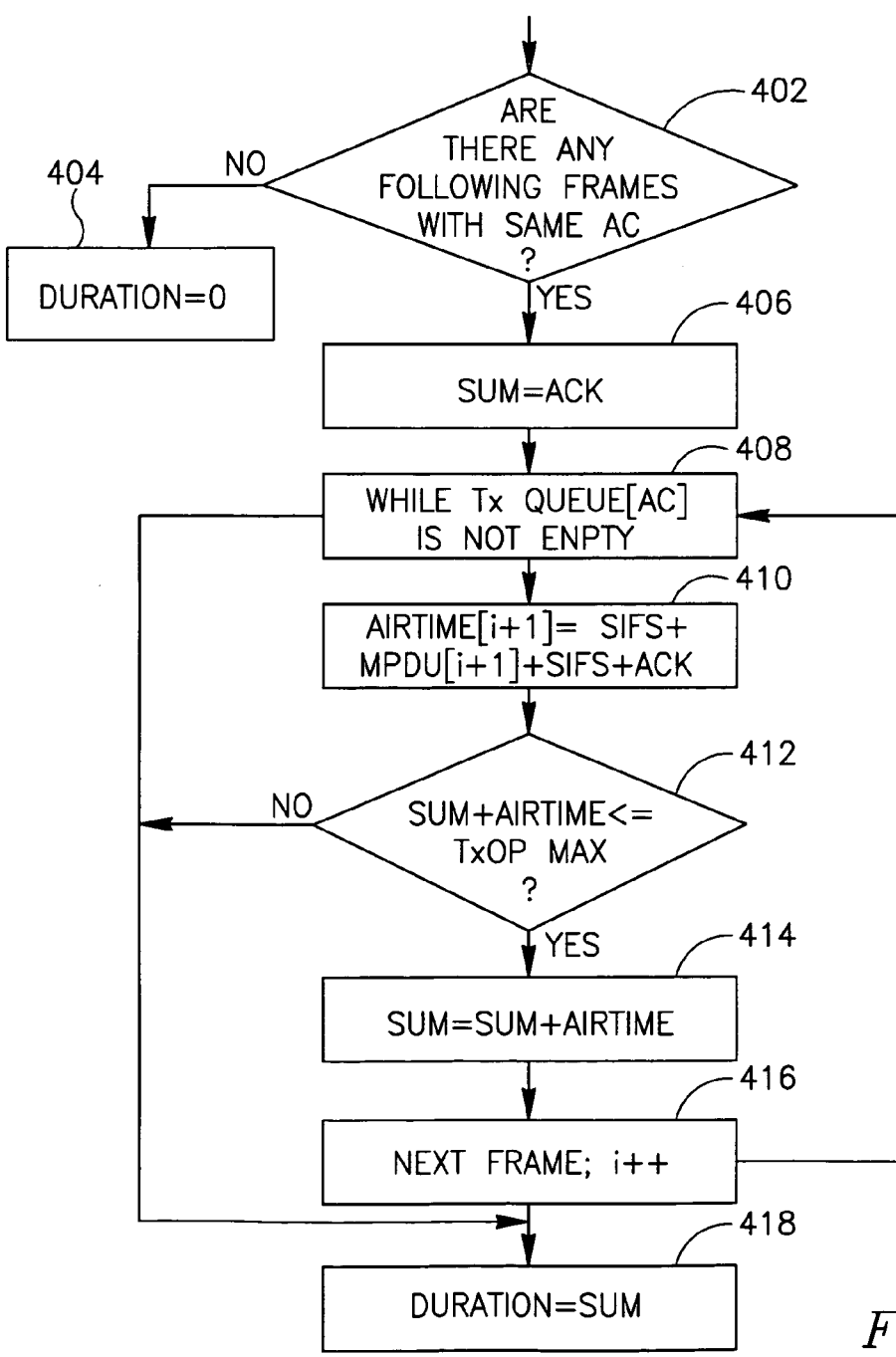
FIG. 4 is a schematic flow-chart illustration of a method of determining a burst-related duration value, in accordance with some demonstrative embodiments of the invention.

Reference is also made to FIG. 4, which schematically illustrates a method of determining a burst-related duration value of a Tx command, in accordance with some demonstrative embodiments of the invention. Although the invention is not limited in this respect, the method of FIG. 4 may be implemented by U-MAC 209 to determine the burst duration value of Tx command 222.

As indicated at block 402, the method may include determining whether the U-MAC Tx queue includes one or more frames, which may be suitable for transmission during the potential burst. For example, UMAC 209 may determine whether queue 211 includes one or more additional frames having the same AC as the current frame.

As indicated at block 404, the method may include setting the burst duration value to zero, e.g., if it is determined that the there are no additional frames, which may be suitable for transmission during the potential burst.

As indicated at block 406, the method may include setting a first value ("sum") equal to an ACK duration, e.g., if it is determined that there are one or more additional frames, which may be suitable for transmission during the potential burst.

As indicated at block 410, the method may include determining a second value ("airtime") corresponding to a frame of the U-MAC queue succeeding the current frame. In one example, the second value may correspond to the sum of the MPDU length of the succeeding frame and a SIFS or PIFS, e.g., if the burst transmission is intended to implement the "No ACK", or the "Block ACK" transmission policy. In another example, the second value may correspond to the sum of the MPDU length of the succeeding frame, a SIFS or PIFS, and an ACK, e.g., if the burst transmission is intended to implement the ACK transmission policy.

As indicated at block 412, the method may include determining whether the sum of the first and second values is equal to or smaller than an available TxOp value, e.g., as is defined by the 802.11e standard.

As indicated at block 414, the method may include setting the first value to be equal to the sum of the first and second values.

As indicated at blocks 416 and 408, the method may include repeating the operations of blocks 410, 412 and/or 414 for one or more additional succeeding frames, e.g., while queue 211 includes one or more frames suitable for transmission during the potential burst, and the determined sum value is equal to or smaller than the TxOp value. For example, U-MAC 209 may repeat the operations of blocks 410, 412 and/or 414, e.g., while queue 211 includes one or more frames having the same AC of the current frame, and the determined sum value is equal to or smaller than the TxOp value.

As indicated at block 418, the method may also include, setting the burst duration value equal to the determined sum value. Thus, for example, the burst duration value may correspond to a transmission period of one or more frames succeeding the current frame, and suitable for transmission during the potential burst.

Referring back to FIG. 2, according to some demonstrative embodiments of the invention, NIC 204 may include a L-MAC 218 associated with host 202, and a Physical (PHY) layer 220 associated with L-MAC 218 and antenna 216, as are described in detail below.

According to demonstrative embodiments of the invention, L-MAC 218 may include a Tx queue 224, a Receive (Rx) queue 230, and a controller 232, as are described below. For example, Tx queue 224 may include a Tx First In First Out (FIFO) queue, and/or Rx queue 230 may include an Rx FIFO queue, as are known in the art. Tx queue 224 may generate signals 226, e.g., including a data portion of Tx command 222; and/or signals 228, e.g., including one or more Tx sub-commands of Tx command 222, e.g., as are described above.

According to some demonstrative embodiments of the invention, controller 232 may receive signals 228 and generate control signals 236, and/or protection-duration signals 237, as described in detail below.

Although the present invention is not limited in this respect, controller 232 may include, for example, an embedded processor, e.g., a CPU, a microprocessor, a plurality of processors, a chip, a microchip, or any other suitable multi-purpose or specific processor able to generate signals 236 and/or 237. according to a desired algorithm, e.g., as described below.

In some demonstrative embodiments of the invention, PHY 220 may include any suitable circuitry and/or hardware to modulate data of signals 226, and/or 237; and to transmit the modulated signals, and/or other signals, e.g., preamble signals, via antenna 216, in accordance with control signals 236. PHY 220 may also include suitable circuitry and/or hardware to demodulate one or more signals, e.g., including one or more data signals, received via antenna 216; and to generate data signals 242, e.g., as is known in the art.

According to demonstrative embodiments of the invention, controller 232 may control Rx queue 230, e.g., using signals 240, e.g., as known in the art. Rx module 230 may receive signals 242 and/or 240, and produce signals 261, e.g., according to a FIFO sequence, as is known in the art.

According to some demonstrative embodiments of the invention, controller 232 may control PHY 220, e.g., using control signals 236, to transmit wireless data packets, e.g., including data of signals 226, in a succession or burst, for example, where no back-off period is required between the transmitted frames. During the burst two or more wireless data packets may be transmitted separated one from another by only SIFS, or PIFS. In some embodiments an ACK may also be transmitted between one or more data frames.

According to some demonstrative embodiments of the invention, controller 232 may apply a protection scheme to one or more subsequent packets of a current packet to be transmitted during the burst period based on one or more burst-related sub-commands of a Tx command corresponding to the current packet. For example, controller 232 may determine the protection scheme, e.g., either one of the next-frame protection scheme, and the entire-burst protection scheme, to be applied to the current packet corresponding to Tx command 222. Controller 232 may determine the protection scheme based on the protection-type sub-command of Tx command 222, e.g., if the current packet is intended to be the first packet in the burst transmission. Controller 232 may ignore the protection type sub-command of Tx command 222 if, for example, the current packet is intended to be transmitted within the burst transmission, e.g., after one or more other packets in the burst transmission ("the previous packets"). In such a case, controller 232 may determine the protection scheme, e.g., either one of the next-frame protection scheme, and the entire-burst protection scheme, to be applied to the subsequent packets in accordance, for example, with a protection scheme applied by the previous packets.

According to some demonstrative embodiments of the invention, controller 232 may also determine the protection-duration value corresponding to the selected protection scheme, e.g., as described below. Controller 232 may generate signals 237 corresponding to the determined protection-duration value, and PHY 220 may transmit the current frame including a protection-duration field corresponding to the protection duration value of signals 237.

Figure 5:
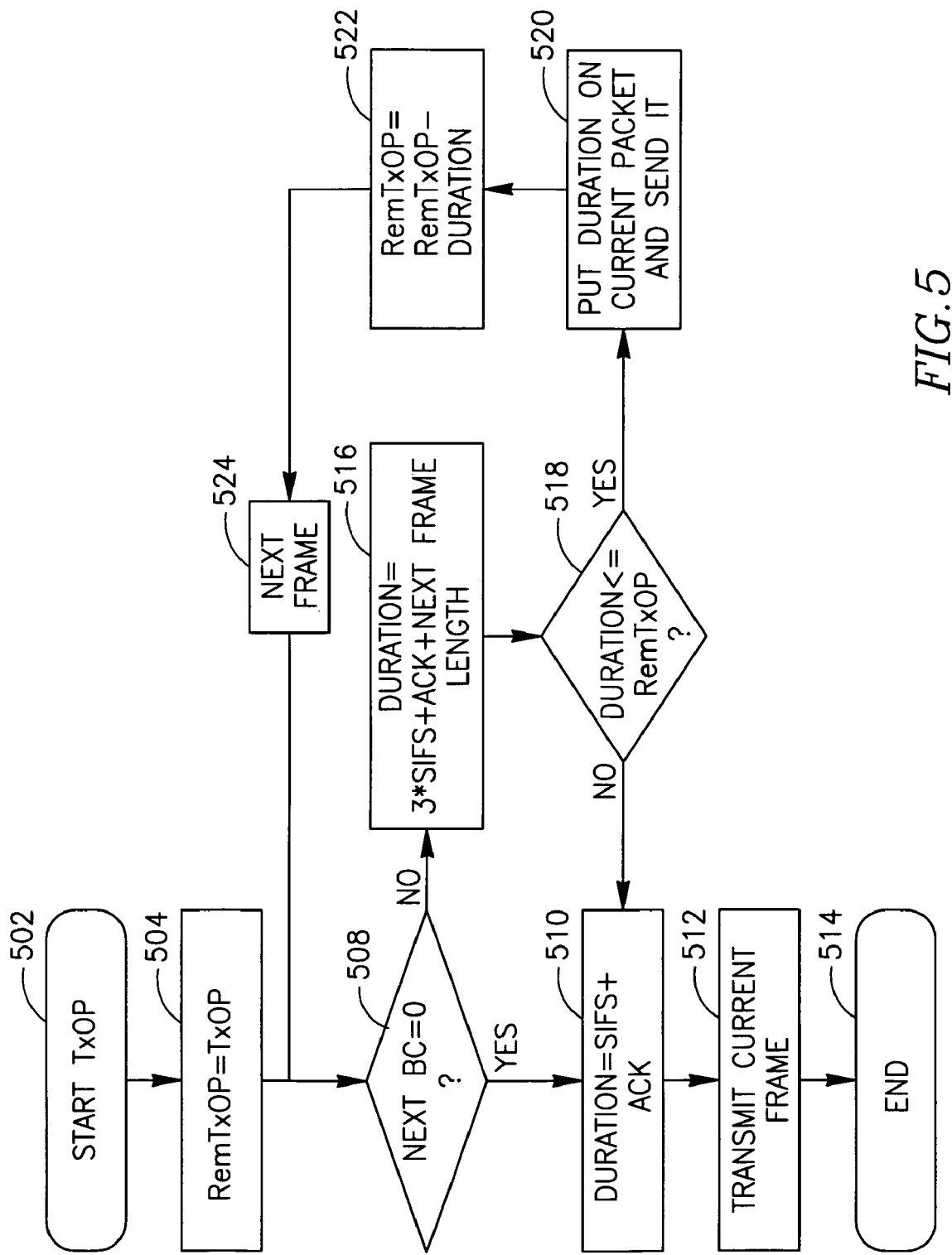
FIG. 5 is a schematic flow-chart illustration of a method of performing a burst transmission using a first protection mechanism, in accordance with some demonstrative embodiments of the invention.

Reference is made to FIG. 5, which schematically illustrates a method of transmitting a burst using a first protection mechanism, in accordance with some demonstrative embodiments of the invention. Although the invention is not limited in this respect, the method of FIG. 5 may be implemented by controller 232 (FIG. 2), e.g., to transmit a burst of one or more packets using the next-frame protection mechanism.

As indicated at block 502, the method may include starting a burst transmission during a TxOp. For example, controller 232 (FIG. 2) may start a burst transmission using the next-frame protection mechanism, e.g., if the protection-type field of the current frame indicates the next-frame protection mechanism was selected by U-MAC 209 (FIG. 2).

As indicated at block 504, the method may include setting a TxOp remainder value equal to the TxOp value.

As indicated at block 508, the method may include determining whether the next-frame duration value of the current frame is equal to zero. A zero next-frame duration value may indicate there are no additional frames intended for transmission during the burst.

As indicated at block 516, the method may include determining the protection duration value to be used for the current packet based on the next-frame duration value, e.g., if the next-frame duration value is non-zero. For example, controller 232 (FIG. 2) may determine the protection duration value corresponding to the sum of the next-frame duration value, three SIFS or PIFS, and an ACK, e.g., if the ACK transmission policy is implemented.

As indicated at block 518, the method may include determining whether the protection-duration value of block 516 is equal to or smaller than the TxOp remainder value.

As indicated at block 520, the method may include transmitting the current packet including the protection-duration value of block 516. For example, controller 232 (FIG. 2) may generate signals 237 (FIG. 2) corresponding to the protection-duration value, e.g., as described above with reference to FIG. 2.

As indicated at block 522, the method may include subtracting the protection-duration value from the TxOp remainder value.

As indicated at block 524, the method may include re-selecting the current frame as a frame succeeding the current frame. For example, controller 232 (FIG. 2) may receive from Tx queue 224 signals 228 corresponding to the next frame.

As indicated at block 510, the method may include setting the protection-duration value equal to the sum of a SIFS or PIFS, and an ACK, e.g., if the next-frame duration value of the current frame is determined to be zero, or if the protection-duration value determined at block 516 is bigger than the TxOp remainder value.

As indicated at block 512, the method may include transmitting the current packet including the protection-duration value of block 510.

As indicated at block 514, the method may include ending the burst transmission.

Figure 6:
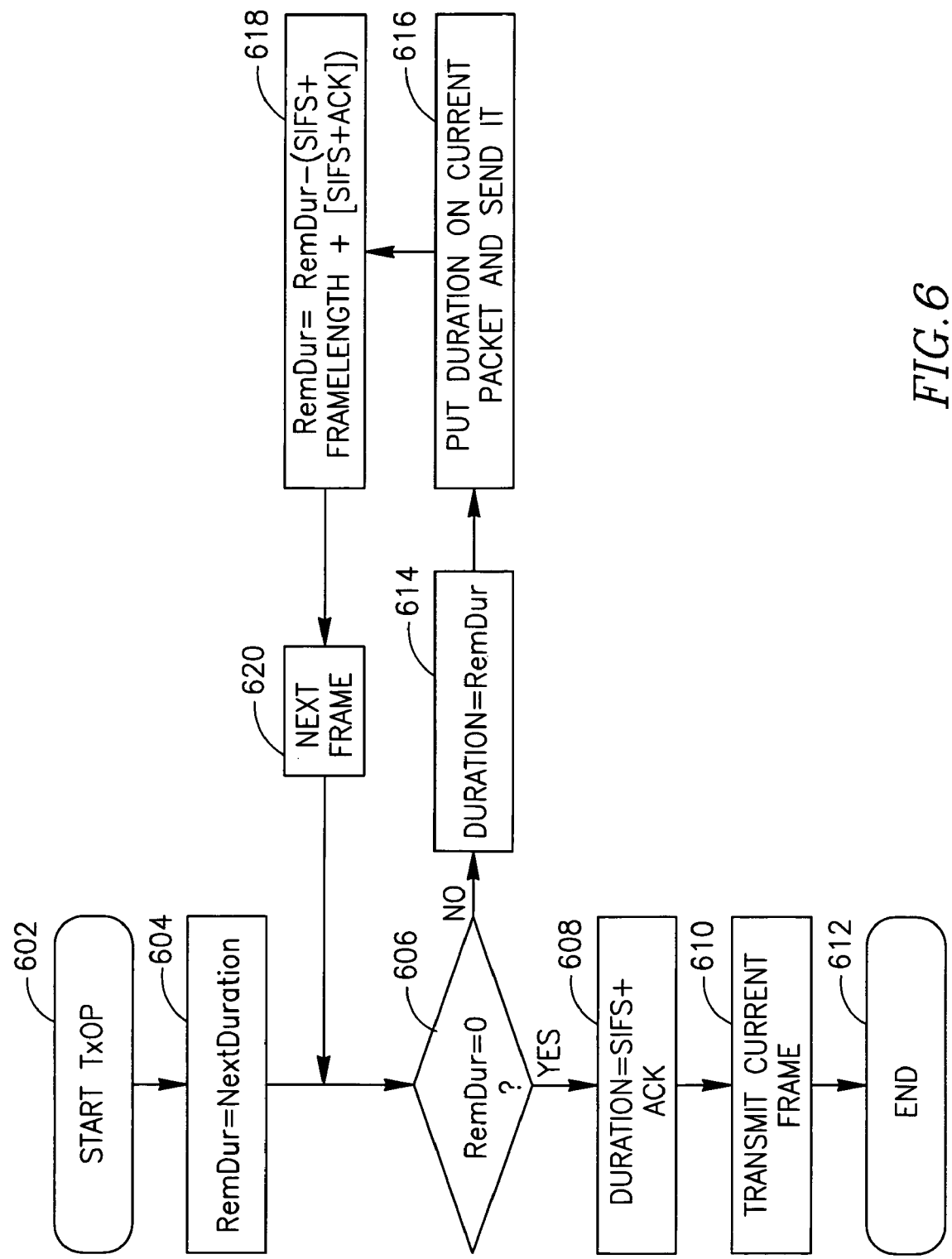
FIG. 6 is a schematic flow-chart illustration of a method of performing a burst transmission using a second protection mechanism, in accordance with some demonstrative embodiments of the invention.

Reference is made to FIG. 6, which schematically illustrates a method of transmitting a burst using a second protection mechanism, in accordance with some demonstrative embodiments of the invention. Although the invention is not limited in this respect, the method of FIG. 6 may be implemented by controller 232 (FIG. 2), e.g., to transmit a burst of one or more packets using the entire-burst protection mechanism.

As indicated at block 602, the method may include starting a burst transmission during a TxOp. For example, controller 232 (FIG. 2) may start a burst transmission using the entire-burst protection mechanism, e.g., if the protection-type field of the current frame indicates the entire-burst protection mechanism was selected by U-MAC 209 (FIG. 2).

As indicated at block 604, the method may include setting a duration remainder value equal to the next-frame duration value of the current frame.

As indicated at block 606, the method may include determining whether the duration remainder value is equal to zero. A zero duration remainder value may indicate there may not be enough time to transmit any additional frames during the burst.

As indicated at block 614, the method may include determining the protection-duration value of the current packet to be equal to the duration remainder value, e.g., if the duration remainder value is non-zero.

As indicated at block 616, the method may include transmitting the current packet including the protection-duration value of block 616. For example, controller 232 (FIG. 2) may generate signals 237 (FIG. 2) corresponding to the protection-duration value, e.g., as described above with reference to FIG. 2.

As indicated at block 618, the method may include subtracting the from the duration remainder value a value corresponding to the sum of the length of the current frame and one or more SIFS or PIFS. In one example, the sum of the length of the current frame and one SIFS may be subtracted, e.g., if the "No ACK" or "Block ACK" transmission policies are implemented. In another example, the sum of the length of the current frame, two SIFS, and an ACK may be subtracted, e.g., if the ACK transmission policy is implemented.

As indicated at block 620, the method may include re-selecting the current frame as a frame succeeding the current frame. For example, controller 232 (FIG. 2) may receive from Tx queue 224 signals 228 corresponding to the next frame.

As indicated at block 608, the method may include setting the protection-duration value equal to the sum of a SIFS or PIFS, and an ACK, e.g., if the duration remainder value of the current frame is determined to be zero.

As indicated at block 610, the method may include transmitting the current packet including the protection-duration value of block 608.

As indicated at block 612, the method may include ending the burst transmission.

Embodiments of the present invention may be implemented by software, by hardware, or by any combination of software and/or hardware as may be suitable for specific applications or in accordance with specific design requirements. Embodiments of the present invention may include units and sub-units, which may be separate of each other or combined together, in whole or in part, and may be implemented using specific, multi-purpose or general processors, or devices as are known in the art. Some embodiments of the present invention may include buffers, registers, storage units and/or memory units, for temporary or long-term storage of data and/or in order to facilitate the operation of a specific embodiment.

While certain features of the invention have been illustrated and described herein, many modifications, substitutions, changes, and equivalents may occur to those of ordinary skill in the art. It is, therefore, to be understood that the appended claims are intended to cover all such modifications and changes as fall within the true spirit of the invention.

What is claimed is:

1. A method comprising:
   receiving a transmit command including one or more burst-related sub-commands corresponding to a current packet to be transmitted during a burst period, wherein the burst-related sub-commands include a protection-type field and at least one transmission duration field indicating an expected transmission duration of at least one packet subsequent to the current packet;
   selecting between first and second collision-protection schemes based on the protection-type field;
   determining a protection duration value based on the selected collision-protection scheme and the at least one transmission duration field; and
   transmitting the current packet, including the protection duration value, during the burst period.

2. The method of claim 1 comprising:
   receiving said transmit command from an upper media-access-controller portion, and
   transmitting said current packet using a lower media-access-controller portion.

3. The method of claim 1, wherein the first and second collision-protection schemes include an entire-burst protection scheme and a next-frame protection scheme, respectively.

4. The method of claim 1 comprising:
receiving a subsequent transmit command including one or more burst-related sub-commands corresponding to a subsequent packet;
regardless of a protection-type field of the subsequent transmit command, determining a subsequent protection duration value based on the previously selected collision-protection scheme; and
transmitting the subsequent packet during the burst period, wherein the subsequent packet includes the subsequent protection duration value.

5. The method of claim 1 comprising generating said transmit command including said one or more sub-commands.

6. The method of claim 1, wherein the at least one transmission duration field includes a next-frame duration value corresponding to an expected transmission duration of a packet immediately successive to said current packet.

7. The method of claim 1, wherein the at least one transmission duration field includes a burst duration value corresponding to an expected transmission duration of one or more subsequent packets to be transmitted during the burst period.

8. The method of claim 1,
wherein receiving the transmit command comprises receiving either a transmit command including a protection-type field indicative of the first collision-protection scheme and a first duration value indicating an expected transmission duration of a packet subsequent to the current packet, or a transmit command including a protection-type field indicative of the second collision-protection scheme, the first duration value, and a second duration value indicating an expected transmission duration of one or more subsequent packets to be transmitted during the burst period,
wherein, if the protection-type field is indicative of the first collision-protection scheme, then determining the protection duration value includes determining the protection duration value based on the first duration value, and
wherein, if the protection-type field is indicative of the second collision-protection scheme, then determining the protection duration value includes determining the protection duration value based on the second duration value.

9. The method of claim 8 comprising:
if the protection-type field is indicative of the first collision-protection scheme, determining a subsequent protection duration value to be included in a subsequent packet based on an expected transmission duration of a packet subsequent to the subsequent packet.

10. The method of claim 8 comprising:
if the protection-type field is indicative of the second collision-protection scheme, determining a subsequent protection duration value to be included in a subsequent packet based on the second duration value and an expected transmission duration of the current packet.

11. The method of claim 10 comprising:
determining a duration remainder value corresponding to an expected duration of said burst period after transmitting said current packet; and
determining the subsequent protection-duration value based on said duration-remainder value.

12. An apparatus comprising:
a controller to receive one or more burst-related sub-commands of a transmit command corresponding to a current packet to be transmitted during a burst period, wherein the burst-related sub-commands include a protection-type field and at least one transmission duration field indicating an expected transmission duration of at least one packet subsequent to the current packet; to select between first and second collision-protection schemes based on the protection-type field; to determine a protection duration value based on the selected collision-protection scheme and the at least one transmission duration field; and to cause the transmission of the current packet, including the protection duration value, during the burst period.

13. The apparatus of claim 12, wherein the first and second collision-protection schemes include an entire-burst protection scheme and a next-frame protection scheme, respectively.

14. The apparatus of claim 12, wherein said controller is to determine a subsequent protection duration value based on the selected collision protection scheme, and to cause the transmission of a subsequent packet, including the determined subsequent protection duration value, during the burst period.

15. The apparatus of claim 12 comprising a transmit-command generator to generate said transmit command including said one or more sub-commands.

16. The apparatus of claim 12, wherein the at least one transmission duration field includes a next-frame duration value corresponding to an expected transmission duration of a packet immediately successive to said current packet.

17. The apparatus of claim 12, wherein the at least one transmission duration field includes a burst duration value corresponding to an expected transmission duration of one or more subsequent packets to be transmitted during the burst period.

18. The apparatus of claim 12, wherein said controller is to either a first set of burst-related sub-command including a protection-type field indicative of the first collision-protection scheme and a first duration value indicating an expected transmission duration of a packet subsequent to the current packet, or a second set of burst-related sub-command including a protection-type field indicative of the second collision-protection scheme, the first duration value, and a second duration value indicating an expected transmission duration of one or more subsequent packets to be transmitted during the burst period,
wherein the controller is to determine the protection duration value based on the first duration value, if the protection-type field is indicative of the first collision-protection scheme, and
wherein the controller is to determine the protection duration value based on the second duration value, if the protection-type field is indicative of the second collision-protection scheme.

19. The apparatus of claim 18, wherein the controller is to determine a subsequent protection duration value to be included in a subsequent packet based on an expected transmission duration of a packet subsequent to the subsequent packet, if the protection-type field is indicative of the first collision-protection scheme.

20. The apparatus of claim 18, wherein the controller is to determine a subsequent protection duration value to be included in a subsequent packet based on the second duration value and an expected transmission duration of the current packet, if the protection-type field is indicative of the second collision-protection scheme.

21. The apparatus of claim 20 wherein said controller is to determine a duration remainder value corresponding to an expected duration of said burst period after said current packet is transmitted, and to determine the subsequent protection-duration value based on said duration remainder value.

22. A wireless transmission system comprising:

a wireless station including:

a controller to receive one or more burst-related sub-commands of a transmit command corresponding to a current packet to be transmitted during a burst period, wherein the burst-related sub-commands include a protection-type field and at least one transmission duration field indicating an expected transmission duration of at least one packet subsequent to the current packet; to select between first and second collision-protection schemes based on the protection-type field; to determine a protection duration value based on the selected collision-protection scheme and the at least one transmission duration field; and to cause the transmission of the current packet, including the protection duration value, during the burst period; and a dipole antenna to transmit said current packet.

23. The wireless transmission system of claim 22 comprising another wireless station to receive said current packet.

24. The wireless transmission system of claim 22, wherein the first and second collision-protection schemes include an entire-burst protection scheme and a next-frame protection scheme, respectively.

25. The wireless transmission system of claim 22, wherein said wireless station comprises a transmit-command generator to generate said transmit command including said one or more sub-commands.

* * * * *